May 22, 1934.  A. M. UNGER  1,960,217

METHOD FOR THE CONTROL OF GRID GLOW TUBES

Filed Sept. 30, 1932

WITNESSES:

INVENTOR
Arthur M. Unger
BY
ATTORNEY

Patented May 22, 1934

1,960,217

UNITED STATES PATENT OFFICE 1,960,217

METHOD FOR THE CONTROL OF GRID-GLOW TUBES

Arthur M. Unger, Wilkinsburg, Pa., assignor to Westinghouse Electric & Manufacturing Company, East Pittsburgh, Pa., a corporation of Pennsylvania Application September 30, 1932, Serial No. 635,546

5 Claims. (Cl. 250—27)

This invention relates to the control of current by means of grid glow tubes.

When the potential upon the grid of a grid-glow tube exceeds a value which is determined by the character of the tube and the plate voltage, the tube becomes conductive. The tube then continues to conduct current until the plate voltage is reduced to zero. Alterations in the grid potential after the tube has once become conductive are without substantial effect upon the current.

This principle has been used to control the total current flowing through the tube by regulating the point within each positive half-cycle of plate voltage at which the grid receives the potential which causes the tube to become conductive. This is ordinarily accomplished by impressing upon the grid an alternating potential of the same frequency as the plate potential and adjusting the phase of the grid potential.

It has been found in attempts to control current in this way that the results obtained are not always consistent but in some cases are different with different tubes even when the tubes are of the same type and are as nearly identical as manufacturing processes will produce. It has also been discovered that, if the phase of the grid voltage lags the plate voltage to an extent which differs slightly with different tubes, further adjustment of the phase of the grid voltage to make it lag more accomplishes no change in the controlled current.

It is an object of this invention to overcome the difficulties in this system of current control just stated.

It is a further object of this invention to provide a method of adjustment whereby the control of the current transmitted through a grid-glow tube by adjustment of the grid phase shall be consistent and shall extend to adjustment of a complete half-cycle or more.

Figure 1:
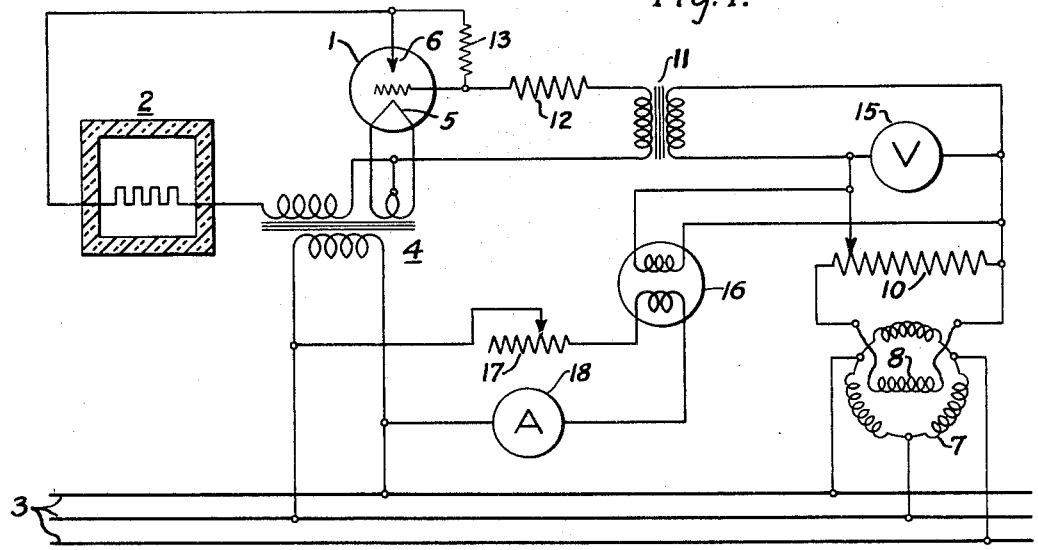

Other objects of the invention and details of the structures and methods employed will be understood from the following description and the accompanying drawing in which:

Figure 1 is a diagram of apparatus and circuits embodying one application of my invention, and Figs. 2 to 5, inclusive, are curves to which reference will be made in the explanation of the principles involved in my invention.

In Fig. 1 a grid-glow tube 1 is connected between the load 2 and the source of energy. Energy is supplied from the transmission line 3 through a transformer 4, one terminal of which is connected to the load and the other terminal to the cathode 5 of the grid glow tube, the anode 6 being connected to the other terminal of the load.

The power line 3 supplies three-phase current which is used to energize the field 7 of a phase regulating device similar in construction to an induction motor having a wound rotor. The winding 8 of the rotor supplies a current, the phase of which is regulated by rotating the rotor to a position corresponding to the desired phase. Current from the rotor winding energizes a potentiometer 10 by means of which the voltage of the current delivered is regulated. The output of the potentiometer is delivered through a transformer 11 and a resistor 12 to the grid of the grid-glow tube 1. Another resistor 13 of several megohms is connected between the grid and the anode of the grid-glow tube in order to ensure stable operation.

If desired, a voltmeter 15 and the voltage coil of a wattmeter 16 may be connected in parallel across the primary of the transformer 11. The current coil of the wattmeter 16 is connected across the primary of the transformer 4. An adjustable resistor 17 and an ammeter 18 are in series with the current coil of the wattmeter. By means of the readings of instruments 15, 16 and 18 the phase of the potential impressed upon the grid is readily determined.

It is possible by adjustment of the position of the rotor to regulate the phase of the potential delivered to the grid and this regulation can extend over any desired number of electrical degrees. An adjustment over more than 360° is thus possible. It is also possible by adjustment of the potentiometer to regulate the amplitude of the potential delivered to the primary of the transformer 11. The design of this transformer may be so chosen that the potential delivered to the grid of the grid glow tube may be made large enough for even the extreme requirements.

Figure 2:
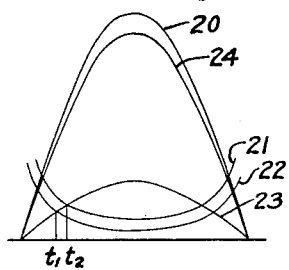

In order to appreciate the effect of the adjustments of phase and amplitude potential upon the grid, reference should first be made to Fig. 2 in which the curve 20 represents the positive half-cycle of the plate potential impressed upon the grid-glow tube. The curve 21 represents for one particular grid-glow tube the critical value of grid voltage for the corresponding plate voltage at each point throughout the half cycle.

As the plate voltage alters from instant to instant, the value of grid potential which will be just sufficient to cause the grid-glow tube to become conductive also varies. For a steady, direct-current potential upon the plate, the corresponding value of grid voltage which will cause the tube to become conductive is fixed, and is for this reason called the critical voltage. For a changing value of plate voltage the corresponding value of grid voltage is not fixed but changes as the cycle proceeds. For this reason it is desirable to use a different name for the value which the grid voltage must exceed at any particular moment within the positive half cycle of the plate voltage for the tube to become conductive at that moment. I, therefore, speak of this momentary value with which the grid voltage must be compared as the discriminatory voltage.

The curve 21 represents the relation between the discriminatory voltage and the progress through the cycle for an individual grid-glow tube. The curve 22 represents the same relation for another grid-glow tube. These two curves represent the extremes for tubes that are manufactured by standard processes and intended to be alike. For practically all such tubes, the curve representing the discriminatory grid voltage throughout the cycle will lie between curves 21 and 22.

If the grid potential in phase with the plate potential be impressed upon the grid-glow tube, as represented by the curve 23, the tube will become conductive at that moment within the cycle indicated at $t_1$ when the instantaneous grid voltage first equaled the instantaneous discriminatory value. The circumstances that, toward the end of the cycle, the grid voltage became smaller than the discriminatory value will not alter the conductivity of the tube. It would become conductive at the time $t_1$ and would continue to be conductive until the end of the positive half cycle, remain non-conductive throughout the whole of the following negative half cycle and so much of the succeeding positive half cycle as corresponds to the time $t_1$.

For another tube, with the discriminatory grid voltage represented by the curve 21, the tube would first become conductive at the time $t_2$, which is different from the time $t_1$, because the one tube has a different discriminatory grid potential value from the other. A smaller amount of current would be carried by the tube corresponding to the curve 21 because the fraction of the cycle during which it conducts current is smaller than for the tube corresponding to the curve 22.

If, instead of the grid voltage represented by the curve 23, a grid voltage of the same phase but of larger amplitude be impressed upon the tube, it can be represented by the curve 24. The grid voltage curve 24 crosses the space between curves 21 and 22 much more steeply than the curve 23. The difference between the time when curve 24 crossed the lower curve 22 and the time when it crossed the upper curve 21 will be much smaller than the difference for curve 23. The difference between the current carried by one tube and that carried by the other will thus be much smaller.

It is, therefore, evident that by making the rate of increase of grid potential sufficiently rapid, the difference in response between one tube and another of the same manufacturing type may be made as small as required. Obviously, if the rate of increase of the grid potential could be made very great, the difference between the behavior of the two tubes would be very small. If the grid potential were of the square wave-form, the difference could be made zero but square wave-form for potential is not conveniently produced. The same effect can be obtained by using large potential of the ordinary sine wave-form.

By adjusting the phase of the potential represented by the curve 24 in Fig. 2 so that instead of being in phase with the plate potential represented by the curve 20, it lags, the point at which curve 24 crosses the curve 21 or 22 may be moved toward the right. In other words the time at which the tube will become conductive may be delayed by increasing the lag of the grid potential. This delay diminishes the current delivered through the tube because the fraction of the positive half-cycle during which the tube is conductive is diminished. If the lag of the grid potential relative to the plate potential were a full 180°, the delay would be a complete half-cycle and the tube would carry no current at all.

It will not be true that every adjustment of the phase of the grid voltage from zero lag to a lag of a complete half-cycle will produce a corresponding change in the current carried by the tube unless the grid potential be sufficient. This will be clear from a consideration of Fig. 3 in which the curve 20 is the plate potential, the curve 26 represents the wave-form which the current would have if current were present throughout the whole half-cycle and the curve 21 represents the discriminatory potential. A single curve for the discriminatory potential is shown because the explanation is applied to one tube. A repetition of the same explanation for each of several tubes is unnecessary.

The grid potential represented by the curve 23 is shown as lagging behind the plate potential by a considerable amount and the amplitude of the grid potential is shown so small that the rising part of the grid potential curve 23 makes only a small angle with the rising part of the discriminatory voltage curve 21. With the particular lag chosen for illustration, the curve 23 is tangent to the curve 21. This means that the grid potential became at one moment equal to the discriminatory potential but never exceeded it. The grid potential continued to increase but the discriminatory potential increased more rapidly with the progress of the cycle. At the moment represented by the time $t_3$ when the grid potential equaled the discriminatory potential, the tube became conductive.

Figure 3:
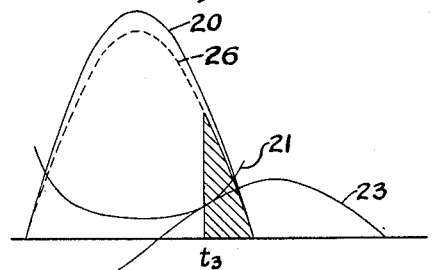

The shaded portion of the area enclosed by the curve 26 shows that fraction of the possible current represented by the whole area was actually conducted by the tube. After the time $t_3$, the circumstance that the grid potential is less than the discriminatory potential will not cause the tube to again become non-conductive. The current represented by the shaded area of Fig. 3 is the smallest current which the tube can be made to conduct by adjustment of the phase of a grid potential the amplitude of which is no greater than that represented by the curve 23 in this figure.

This will be evident if an increase of the lag of the grid potential in this figure be considered. Such an increase would be represented by a displacement of the curve 23 to the right. The curve 23 would then fail to touch the curve 21 at all which means that the tube would remain non-conductive throughout the whole of the positive half-cycle.

Starting with a lead sufficient to cause the curve 23 to cross curve 21 to the left of the beginning of the cycle, consider the effect of progressively increasing the lag, that is of displacing curve 23 progressively toward the right. In the first position, the tube would be conductive throughout the whole positive half-cycle and full current would be obtained. From this position of the curve 23 to the position illustrated in Fig. 3, the curve 23 will cross the curve 21 at some point to the left of the point $t_3$; that is, the tube will become conductive at some time within the cycle earlier than $t_3$ and, therefore, will conduct some fraction of the full current greater than that shown by the shading in Fig. 3. If the lag be increased, the tube conducts no current. Therefore, the control of the current through the tube by adjustment of the lag of the grid potential terminates when the lag is as represented in Fig. 3. Increase of lag beyond this produces no change in the value of the current, which is already zero.

Figure 4:
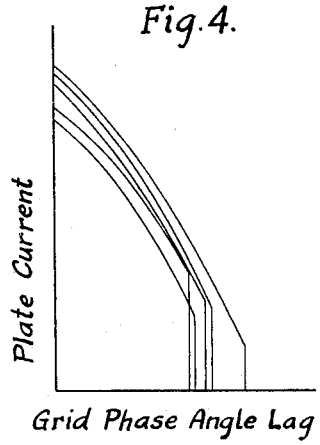
Figure 5:
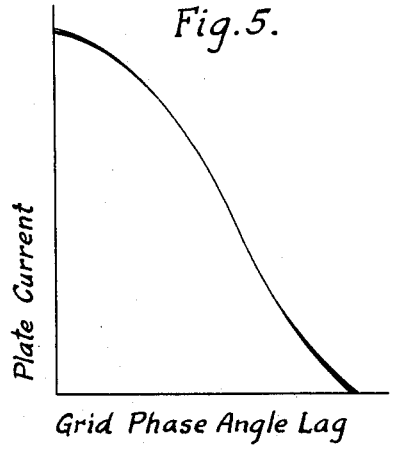

In Fig. 4 the several curves represent the plate current corresponding to each particular adjustment of the lag of the grid voltage for five different tubes. It will be observed that over the left-hand portion of these curves there is a continuous alteration of the plate current by an alteration of the lag of the grid current, but, from a certain point onward toward the right, the plate current is zero regardless of the adjustment of the lag of the grid voltage; that is, throughout a certain range of adjustment no control over the plate current is accomplished by adjusting the lag of the grid voltage.

If instead of a grid voltage like that represented in Fig. 3, a grid voltage like that represented by the curve 24 in Fig. 2 be considered, it will be perceived that the grid voltage curve will always cross the curve 21 at all lags up to and including a complete half cycle. With a voltage upon the grid of this amplitude curves may be obtained like those shown in Fig. 5; that is, the plate current may be brought to zero without any abrupt drop and the several curves representing the behavior of individual tubes will very nearly coincide with each other.

In addition to the particular provision for adjusting the voltage and phase of the grid potential shown in Fig. 1, many means are familiar to those skilled in the art and need not be separately described. In Fig. 1 the control current is shown as applied to a resistance furnace but this method of control is applicable to many other loads.

The gradual approach of the current to zero with increase in the lag of the grid potential instead of an abrupt drop of the plate current to zero when a certain lag is exceeded is particularly useful when the load is a lamp the brightness of which is to be decreased by gradually decreasing the current through it and an abrupt extinguishing of the lamp is undesirable. The reproducible character of the control whereby consistent results can be obtained when applying it to different individual grid glow tubes is of particular importance in the application of this form of control to dimmers for theatre lighting systems wherein the same degree of illumination must be obtained even when one grid glow tube is substituted for another.

Many modifications of the structure shown and of the methods described will readily occur to those skilled in the art and the specific description of a single structure and method is not to be understood as a limitation. The only limitations intended are those required by the prior art and indicated in the accompanying claims.

I claim as my invention:

1. The method of rendering effective the control of a grid-controlled tube by adjustment of the phase of the grid potential when the grid potential lags the anode potential, which consists in adjusting the amplitude of the grid potential to a value sufficient to render the difference in discriminatory grid potential between individual tubes of like manufacture of substantially no effect.

2. The method of controlling current by means of a grid controlled space-current device which becomes conducting upon the grid receiving a potential above a discriminatory value and remains conductive until the current therethrough becomes zero, which consists in impressing an alternating voltage upon said space-current device and an alternating voltage of the same frequency upon the grid, adjusting the magnitude of said grid voltage to a value sufficient to ensure definite correlation between the phase of said grid voltage and the phase of its arriving at the discriminatory value and adjusting the phase of the grid voltage in accordance with the portion of the cycle during which it is desired that the space-discharge device shall be conductive.

3. The method of rendering consistent the control of current through a grid-glow tube supplied with alternating grid-potential by adjustment of the phase of the grid potential which consists in adjusting the amplitude of the grid voltage without changing its wave shape to a value sufficient to make the rate of rise of instantaneous grid potential so rapid at the time it approaches the discriminatory value that the difference between the phase at which it first exceeds the discriminatory grid potential with one tube will not substantially differ from that for another tube.

4. The method of controlling the supply of current through a grid-glow tube which consists in impressing upon the grid thereof an alternating potential, the frequency of said impressed potential being like that supplied through the tube, the amplitude of said impressed potential being such that the rate of increase thereof at that moment in each cycle when it first equals the discriminatory grid potential exceeds the maximum rate of increase of discriminatory grid potential with progress through the cycle and increasing the phase-lag of said impressed potential in accordance with the desired decrease in supplied current.

5. The method of rendering consistent the control of current supplied by an alternating current source through a grid-glow tube supplied with alternating grid-potential from the same source by adjustment of the phase of the grid potential; which consists in adjusting the amplitude of the grid voltage, while maintaining its frequency at the same value as the frequency of the source, to a value sufficient to make the rate of rise of instantaneous grid potential so rapid at the time it approaches the discriminatory value that the difference between the phase at which it first exceeds the discriminatory grid potential with one tube will not substantially differ from that for another tube.

ARTHUR M. UNGER.